United States Patent
Kato et al.

(10) Patent No.: US 9,780,880 B2
(45) Date of Patent: Oct. 3, 2017

(54) RELAY DEVICE AND OPTICAL NETWORK SYSTEM

(71) Applicant: FUJITSU LIMITED, Kawasaki-shi, Kanagawa (JP)

(72) Inventors: Tomoyuki Kato, Yokohama (JP); Shigeki Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 14/134,795

(22) Filed: Dec. 19, 2013

(65) Prior Publication Data
US 2014/0269784 A1 Sep. 18, 2014

(30) Foreign Application Priority Data

Mar. 18, 2013 (JP) ................................ 2013-055074

(51) Int. Cl.
*H04J 14/02* (2006.01)
*H04B 10/27* (2013.01)
*G02F 1/01* (2006.01)

(52) U.S. Cl.
CPC ............ *H04B 10/27* (2013.01); *G02F 1/011* (2013.01); *H04J 14/02* (2013.01); *H04J 14/025* (2013.01); *H04J 14/0247* (2013.01); *H04J 14/0252* (2013.01); *H04J 14/0282* (2013.01); *H04J 14/0298* (2013.01); *H04J 14/0246* (2013.01)

(58) Field of Classification Search
None
See application file for complete search history.

(56) References Cited

U.S. PATENT DOCUMENTS

| | | | | |
|---|---|---|---|---|
| 5,440,415 A | * | 8/1995 | Mekawi | H04J 14/0298 398/187 |
| 6,377,393 B1 | * | 4/2002 | Saeki | H04B 10/07 359/341.2 |
| 2005/0259989 A1 | * | 11/2005 | Sorin et al. | 398/79 |

(Continued)

FOREIGN PATENT DOCUMENTS

| | | |
|---|---|---|
| EP | 0 637 880 A1 | 2/1995 |
| EP | 2 367 050 A1 | 9/2011 |

(Continued)

OTHER PUBLICATIONS

Elschner et al., "Distributed Ultradense Optical Frequency-Division Multiplexing Using Fiber Nonlinearity", Journal of Lightwave Technology, vol. 31, No. 4, IEEE, Feb. 15, 2013, pp. 628-633.

(Continued)

*Primary Examiner* — Christopher Grey
*Assistant Examiner* — Wilfred Thomas
(74) *Attorney, Agent, or Firm* — Staas & Halsey LLP

(57) ABSTRACT

A relay device includes: a first port, a plurality of second ports, a splitter configured to branch first optical signals input from the first port into the plurality of second ports; and a plurality of optical modulators configured to modulate shared carrier light by multiplexing the carrier light with a plurality of second optical signals with different frequencies input from the plurality of second ports and by inputting the multiplexed carrier light into a plurality of nonlinear optical mediums, and to transmit the carrier light to the first port.

9 Claims, 12 Drawing Sheets

(56) References Cited

U.S. PATENT DOCUMENTS

| | | | |
|---|---|---|---|
| 2011/0229138 A1* | 9/2011 | Watanabe | G02F 2/004 |
| | | | 398/79 |
| 2012/0243873 A1* | 9/2012 | Morper | H04L 12/2879 |
| | | | 398/69 |
| 2013/0051803 A1 | 2/2013 | Kato et al. | |
| 2013/0077967 A1* | 3/2013 | Woodward | H04J 14/04 |
| | | | 398/44 |

FOREIGN PATENT DOCUMENTS

| | | |
|---|---|---|
| EP | 2 424 141 A2 | 2/2012 |
| JP | 2005-269239 | 9/2005 |
| JP | 2013-51541 | 3/2013 |

OTHER PUBLICATIONS

Nishihara et al., "Highly Efficient Data Aggregation on Single Optical Carrier through Fiber Frequency Conversion of Discrete Multi-Tone Signal", Optical Fiber Communication Conference and Exposition and the National Fiber Optic Engineers Conference (OFC/NFOEC), IEEE, Mar. 17, 2013, pp. 1-3.

Office Action issued by the Patent Office of Japan on Oct. 4, 2016 in corresponding Japanese patent application No. 2013-055074.

Extended European Search Report issued by the European Patent Office dated Jul. 18, 2017 in corresponding European patent application No. 13199658.9.

* cited by examiner

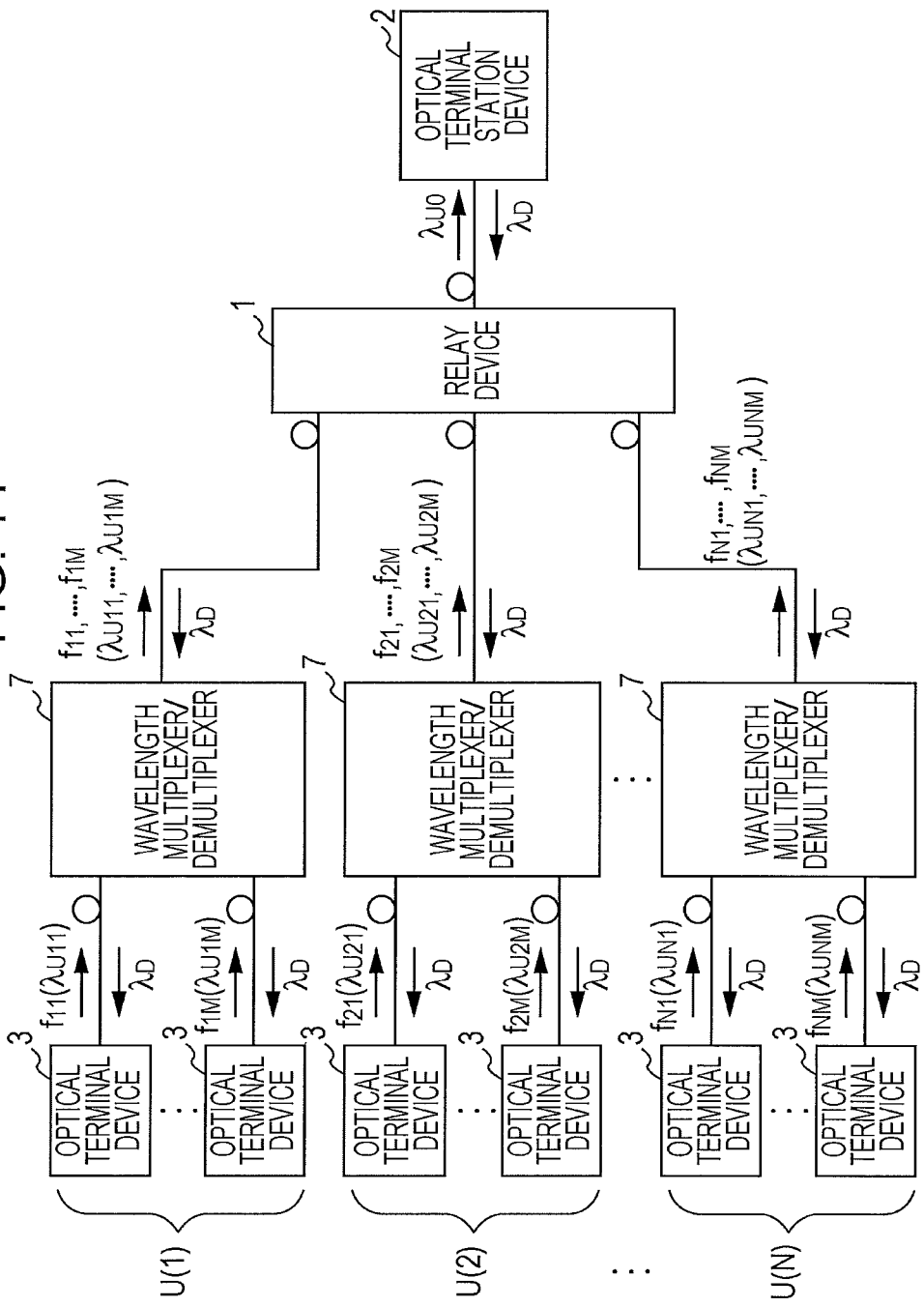

RELAY DEVICE AND OPTICAL NETWORK SYSTEM

CROSS-REFERENCE TO RELATED APPLICATION

This application is based upon and claims the benefit of priority of the prior Japanese Patent Application No. 2013-055074, filed on Mar. 18, 2013, the entire contents of which are incorporated herein by reference.

FIELD

The embodiments discussed herein relate to a relay device and an optical network system.

BACKGROUND

Optical lines such as a passive optical network (PON) are becoming more common in place of metal lines such as asymmetric digital subscriber line (ADSL) as communication lines for subscriber loops accompanying the increase in demand in communications. An optical terminal station device and a plurality of optical terminal devices that constitute PON represent a form of access system optical network connected through an optic coupler for splitting light as disclosed in, for example, Japanese Laid-open Patent Publication No. 2005-269239.

An optical terminal station device is called optical line termination (OLT) and is a communication device installed in a building of an optical communication service provider. The optical terminal device is called an optical network unit (ONU) and is a communication device installed in the home of a subscriber of the optical communication service. The transmission direction from the ONU to the OLT is defined as the uplink direction, and the transmission direction from the OLT to the ONU is defined as the downlink direction.

The optic coupler configures an optical network having a star topology by connecting one OLT with, for example, thirty-two ONU devices. One benefit of the PON is that the number of optical fiber lines (transmission lines) installed in the building and in the homes is reduced due to the star topology.

Conversely, one problem with PON relates to the bandwidth efficiency of the uplink signals transmitted from the ONU to the OLT. Since the optic coupler and the OLT are connected by one optical fiber line, uplink signals are previously attributed with individual transmission timings from the OLT to each ONU in order to avoid collisions. As a result, the uplink signals from the ONUs are transmitted to the OLT using time-division multiplexing (TDM).

However, a certain amount of guard time is provided in the headers of the uplink signals since the arrival time of an uplink signal varies due to environmental factors such as temperature and the like. The guard time reduces bandwidth efficiency since uplink signal bandwidth is consumed.

Another problem with PON relates to transmission distance. The ONU may not be provided with an optical transmitter capable of long distance transmission due to cost restraints. While lengthening the transmission distance by providing an optical amplifier in the transmission line may be considered, surges in the optical amplifier may occur due to burst signals such that the uplink signals from the ONU are not transmitted in a stable manner.

In contrast, the above problem can be resolved by adopting frequency multiplex transmission such as orthogonal frequency-division multiplexing (OFDM) in the access system optical network. In this case, collisions are avoided and time division multiplexing does not have to be used since the uplink signals from the ONUs can be conveyed at the same time using subcarriers with different frequencies. Moreover, the uplink signals from the ONUs may allow the transmission distance to be lengthened since burst signals do not have to be used.

However, when frequency multiplex transmission is adopted, beat noise may occur between uplink signals due to the relationship between the oscillation wavelength of the light of the uplink signals and the subcarrier frequency (modulation frequency) since the uplink signals from the ONUs are carried by subcarriers with different frequencies. Specifically, since the frequency spectra of the uplink signals overlap, different frequencies are generated and transmission errors may occur.

SUMMARY

According to an aspect of the embodiments, a relay device includes: a first port, a plurality of second ports, a splitter configured to branch first optical signals input from the first port into the plurality of second ports; and a plurality of optical modulators configured to modulate shared carrier light by multiplexing the carrier light with a plurality of second optical signals with different frequencies input from the plurality of second ports and by inputting the multiplexed carrier light into a plurality of nonlinear optical mediums, and to transmit the carrier light to the first port.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 illustrates a configuration of a modified example of an optical network system.

DESCRIPTION OF EMBODIMENTS

Figure 1:
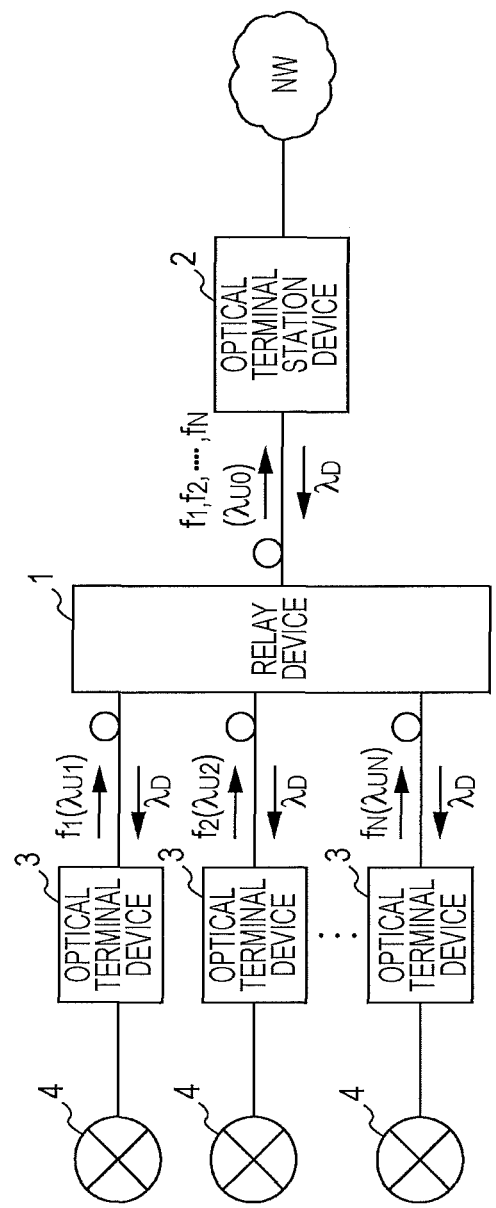
FIG. 1 is a configuration of an example of an optical network system.

FIG. 1 is a configuration of an example of an optical network system. The optical network system includes a relay device 1, an optical terminal station device 2, and a plurality of optical terminal devices 3, and is used, for example, in an access system optical network.

The optical terminal station device 2 is installed in a building of the provider of the optical communication service (i.e., an internet connection service based on optical communication), and is connected to an external backbone system network NW through, for example, a wavelength-multiplexed transmission device (not illustrated). The optical terminal station device 2 is connected to the relay device 1 via a transmission line such as optical fiber and the like. The optical terminal station device 2 transmits optical signals of a wavelength $\lambda_D$ to the plurality of optical terminal devices 3 via the relay device 1. The optical signal (first optical signal) of the wavelength $\lambda_D$ is referred to as a "downlink signal" in the following explanation. The communication direction from the optical terminal station device 2 to the plurality of optical terminal devices 3 is described as the "downlink direction."

The plurality of optical terminal devices 3 are each installed in the home of a subscriber of the optical communication service, and is connected to a local area network (LAN) 4 inside the subscriber's home via, for example, a router (not illustrated). The plurality of optical terminal devices 3 are connected to the relay device 1 via a transmission line such as optical fiber and the like. The plurality of optical terminal devices 3 transmit optical signals (second optical signals) of frequencies $f_1, f_2, \ldots f_N$ (wavelengths $\lambda_{U1}, \lambda_{U2}, \ldots, \lambda_{UN}$) (where N is a natural number of 2 or more) to the relay device 1. The optical signals of frequencies $f_1, f_2, \ldots, f_N$ are described as "uplink signals" in the following explanation. The communication direction from the plurality of optical terminal devices 3 to the optical terminal station device 2 is described as the "uplink direction."

Ethernet (trademark) frames are an example of a frame format for the uplink signals and the downlink signals, but the frame format is not limited in this way and other formats such as asynchronous transfer mode (ATM) may be adopted. The uplink signal includes transmission source information that indicates the optical terminal device 3 that is the transmission source. Destination information indicating the optical terminal device 3 that is the destination is added to each data region (payload region) in the downlink signal. The destination information indicates a broadcast address when the target of the data transmission includes all of the optical terminal devices 3. Specifically, all six bytes of a destination address (DA) would be "FF" using the example of an Ethernet frame.

The relay device 1 is connected to the optical terminal station device 2 and the plurality of optical terminal devices 3 and relays communication between both sides. The relay device 1 configures an optical network having a star topology by connecting the one optical terminal station device 2 with the plurality of optical terminal devices 3 in the same way as the abovementioned PON. As a result, by installing the relay device 1 in the vicinity of subscriber homes in which the optical terminal devices 3 are installed, the number of optical fiber lines (transmission lines) installed between the building and in the subscriber homes is reduced in the optical network system of the present embodiment. Locations for installing the relay device 1 include, for example, an equipment box on a telephone pole or in a shared space for collective housing.

The relay device 1 relays the downlink signals of the wavelength $\lambda_D$ from the optical terminal station device 2 to the plurality of optical terminal devices 3 in the downlink direction by using a passive optical element. Conversely, in the uplink direction, the relay device 1 relays the uplink signals different from the frequencies $f_1, f_2, \ldots, f_N$ by using a nonlinear optical effect to frequency-multiplex shared carrier light having the wavelength $\lambda_{UO}$. The following is an explanation of the relay device 1.

Figure 2:
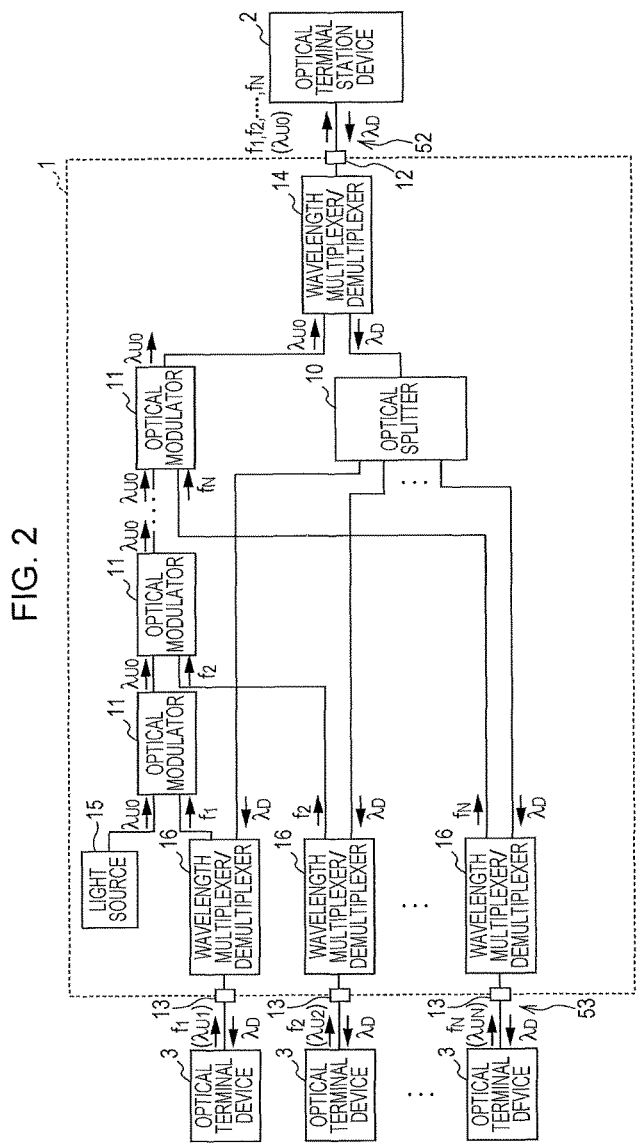
FIG. 2 illustrates a functional configuration of a relay device according to a first embodiment.

FIG. 2 illustrates a functional configuration of a relay device according to a first embodiment. The relay device 1 includes an optical splitter 10, a plurality of optical modulators 11, a first port 12, a plurality of second ports 13, an uplink wavelength multiplexer/demultiplexer 14, a light source 15, and a plurality of downlink wavelength multiplexer/demultiplexers 16.

The first port 12 and the plurality of second ports 13 are optical connectors for example. The first port 12 is connected to a transmission line 52 on the optical terminal station device 2 side, and the plurality of second ports 13 are connected to transmission lines 53 on the plurality of optical terminal devices 3 side. The uplink signals, the downlink signals, and the carrier light are input into the relay device 1 or output from the relay device 1 via the first port 12 and the plurality of second ports 13.

The uplink wavelength multiplexer/demultiplexer 14 is, for example, a wavelength division multiplexing (WDM) coupler and multiplexes and demultiplexes light of different wavelengths and travel directions. The uplink wavelength multiplexer/demultiplexer 14 guides the downlink signal input from the optical terminal station device 2 via the first port 12 to the optical splitter 10. The uplink wavelength multiplexer/demultiplexer 14 also guides modulated carrier light that has been output from the plurality of optical modulators 11 to the first port 12.

The optical splitter 10 branches, according to power, the downlink signals input from the uplink wavelength multiplexer/demultiplexer 14 to the plurality of downlink wavelength multiplexer/demultiplexers 16.

The plurality of downlink wavelength multiplexer/demultiplexers 16 are, for example, WDM couplers. The plurality of downlink wavelength multiplexer/demultiplexers 16 guide the downlink signal input from the optical splitter 10 to each of the plurality of second ports 13. The plurality of downlink wavelength multiplexer/demultiplexers 16 also guide the uplink signal input from each of the plurality of optical terminal devices 3 via the plurality of second ports 13 to the plurality of optical modulators 11.

The plurality of optical modulators 11 are connected in series to each other and modulate shared carrier light input from the light source 15 with the uplink signal from the plurality of optical terminal devices 3. The light source 15 supplies continuous wave (CW) light of the wavelength $\lambda_{UO}$ to the plurality of optical modulators 11 as carrier light. The continuous wave light is input and modulated sequentially by the optical modulators 11 and is transmitted to the optical terminal station device 2 from the final optical modulator 11 via the uplink wavelength multiplexer/demultiplexer 14 and the first port 12. The uplink signals are superposed on the carrier light.

Figure 3:
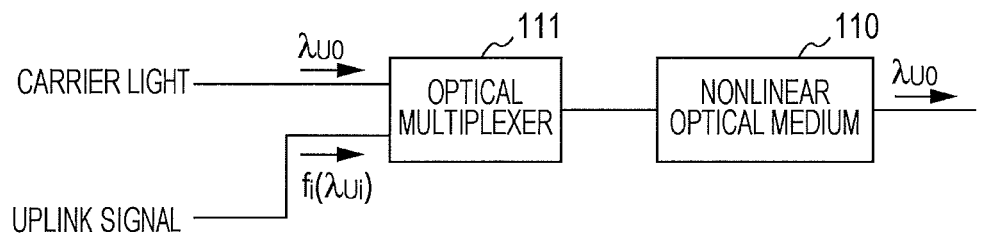
FIG. 3 illustrates an example of an optical modulator.

FIG. 3 illustrates an example of the optical modulator 11. The optical modulator 11 includes an optical multiplexer 111 and a nonlinear optical medium 110 connected to each other. The optical multiplexer 111 is, for example, an optic coupler or a WDM coupler and multiplexes the carrier light input from the light source 15 or an adjacent optical modulator 11 with the uplink signals input from the optical terminal devices 3 and guides the multiplexed light to the nonlinear optical medium 110.

The nonlinear optical medium 110 is a medium, such as for example an optical fiber, that produces a nonlinear optical effect. A single mode fiber, a dispersion-shifting fiber, a high nonlinear optical fiber (HNLF), a photonic crystal fiber, and a chalcogenide fiber may be used as the optical fiber. Moreover, a fiber or waveguiding structure in which germanium or bismuth and the like are added to the core may be used as the nonlinear optical medium 110 to increase the refractive index. Similarly, a fiber or waveguiding structure having a contracted mode field may be used as the nonlinear optical medium 110 to increase the optical power density.

Cross phase modulation (XPM) is an example of the nonlinear optical effect brought about by the nonlinear optical medium 110. Cross phase modulation is a phenomenon in which a phase change occurs within one light in proportion to the intensity of another light when two light waves with different wavelengths propagate inside the nonlinear optical medium.

The uplink signals are superposed on the carrier light due to the cross phase modulation between the carrier light and the uplink signals. Specifically, the carrier light is modulated by the uplink signals and the data of the uplink signals is transcribed onto the modulated components. Since the frequencies $f_1, f_2, \ldots, f_N$ differ among the uplink signals, the carrier light is transmitted as optical signals that are optical-frequency multiplexed by modulation to the optical terminal station device 2.

Figure 4:
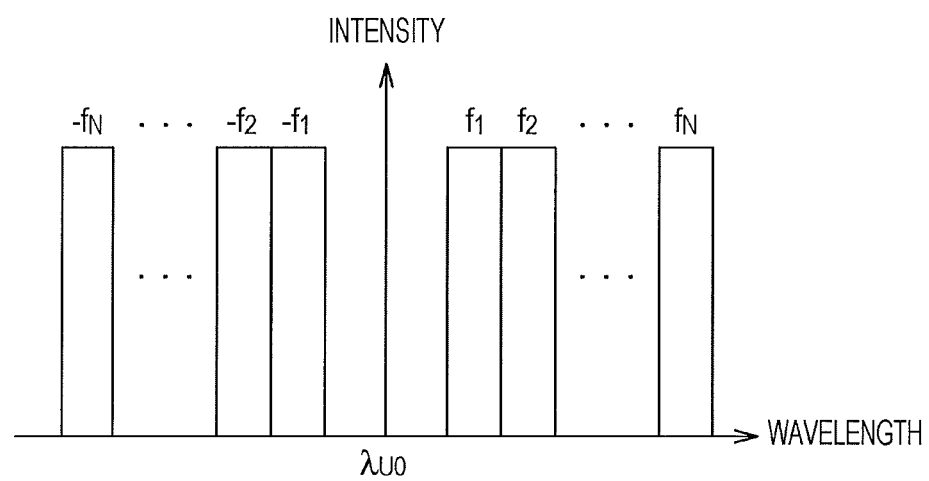
FIG. 4 illustrates spectra of optical frequency multiplexed signals.

FIG. 4 represents spectra of light frequency multiplexed signals. The uplink signals of frequencies $f_1, f_2, \ldots, f_N$ are frequency-divided and accommodated inside the modulation bandwidth of the wavelength $\lambda_{UO}$ of the carrier light. As a result, the frequencies $f_1, f_2, \ldots, f_N$ are managed closely in units from MHz to GHz.

The nonlinear optical medium 110 nonlinear optical effect that may be used in the optical modulator 11 is not limited to the cross phase modulation, and other effects such as cross gain modulation, an optical parametric effect, or optical intensity modulation based on an optical Kerr switch may be raised as examples of this effect. The nonlinear optical medium is not limited to optical fiber, and, for example, a high refractive index differential light waveguide such as periodical polarization inverted lithium niobate, a semiconductor amplifier, or a silicon wire waveguide may also be used.

In this way, the plurality of optical modulators 11 multiplexes the plurality of uplink signals with different frequencies $f_1, f_2, \ldots, f_N$ input from the plurality of optical terminal devices 3 via the plurality of second ports 13, with the shared carrier light and inputs the multiplexed signals to the plurality of nonlinear optical mediums 110. As a result, the plurality of optical modulators 11 modulates the carrier light and transmits the carrier light as light frequency multiplexed signals to the optical terminal station device 2 via the first port 12.

Therefore, the relay device 1 superposes the uplink signals from the optical terminal devices 3 onto the carrier light with the one wavelength $\lambda_{UO}$ and transmits the superposed uplink signals to the optical terminal station device 2. As a result, the relay device 1 does not generate beat noise between the uplink signals in contrast to a case in which a plurality of carrier light with different wavelengths is used.

Moreover, since the relay device 1 frequency-multiplexes the uplink signals with the shared carrier light without performing time division multiplexing, the transmission efficiency of the uplink signals is improved. Further, since the carrier light is not a burst signal, the optical network system including the relay device 1 may allow for the lengthening of the transmission distance with the use of an optical amplifier.

Conversely, in relation to the downlink direction, the relay device 1 uses the optical splitter 10 for relaying the downlink signals from the optical terminal station device 2 to the plurality of optical terminal devices 3. The downlink signals at this time are input into the relay device 1 via the first port 12 from which the modulated carrier light is output, and the downlink signals are output from the relay device 1 via a second port 13 into which the uplink signals are input. As a result, the number of optical fibers to be used may be reduced since the relay device 1 is able to be configured in a star topology optical network along with the optical terminal station device 2 and the plurality of optical terminal devices 3.

Figure 5:
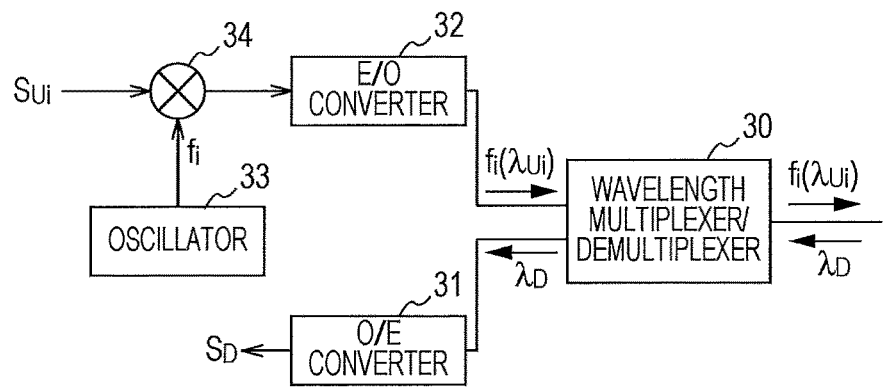
FIG. 5 illustrates an example of an optical terminal device.

The following is an explanation of a configuration of the optical terminal device 3. FIG. 5 illustrates an example of the optical terminal device 3. The optical terminal device 3 includes a wavelength multiplexer/demultiplexer 30, an optical-to-electric converter (O/E converter) 31, an electric-to-optical converter (E/O converter) 32, an oscillator 33, and a mixer 34.

The mixer 34 modulates electrical data signals $S_{Ui}$ (i=1 to N) received from a LAN 4 on the basis of signals of frequency $f_i$ (wavelength $\lambda_{Ui}$) input from the oscillator 33. The oscillator 33 may be, for example, a voltage-controlled crystal (Xtal) oscillator (VCXO). The frequency $f_i$ (wavelength $\lambda_{Ui}$) is determined according to a control voltage applied to the oscillator 33.

The electric-to-optical converter 32 is, for example, a laser diode (LD), and converts the modulation signals output from the mixer 34 to optical signals and outputs the optical signals to the wavelength multiplexer/demultiplexer 30 as the abovementioned uplink signals. The wavelength multiplexer/demultiplexer 30 is, for example, a WDM coupler, and guides the uplink signals via the transmission line 53 to the relay device 1.

The wavelength multiplexer/demultiplexer 30 guides the downlink signal input from the relay device 1 through the transmission line 53 to the optical-to-electric converter 31. The optical-to-electric converter is, for example, a photo diode (PD), and converts the downlink signal that are optical signals to electrical data signals $S_D$. The data signals $S_D$ are transmitted to the LAN.

Figure 6:
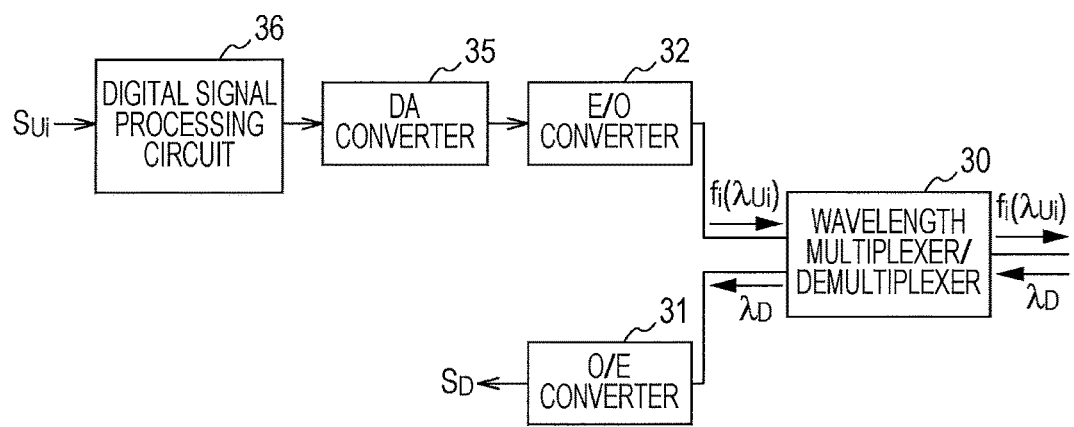
FIG. 6 illustrates another example of an optical terminal device.

FIG. 6 illustrates another example of the optical terminal device 3. The same configurations that are in FIG. 5 are given the same reference numbers in FIG. 6 and explanations thereof are omitted.

The optical terminal device 3 includes the wavelength multiplexer/demultiplexer 30, the optical-to-electric converter 31, the electric-to-optical converter 32, a digital signal processing circuit 36, and a DA converter 35.

The digital signal processing circuit 36 uses a digital modulation system such as quadrature amplitude modulation (QAM) or phase shift keying (PSK) to modulate electrical data signal $S_{Ui}$ received from the LAN 4. The modulated data signal $S_{Ui}$ are input into the DA converter 35 and converted from digital signals to analog signals. The electric-to-optical converter 32 converts the a signal output from the DA converter 35 into an optical signal and outputs the optical signal to the wavelength multiplexer/demultiplexer 30 as the abovementioned uplink signal.

Figure 7:
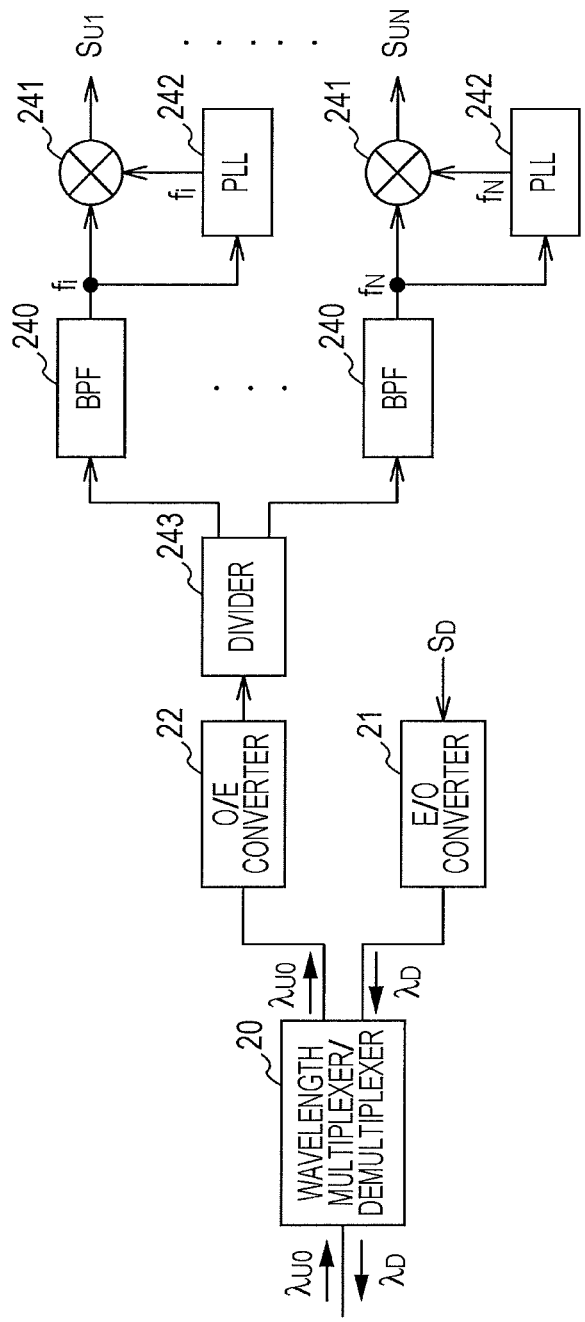
FIG. 7 illustrates an example of an optical terminal station device.

The following is an explanation of the optical terminal station device 2. FIG. 7 illustrates an example of the optical terminal station device 2. The optical terminal station device 2 of the present embodiment corresponds to the optical terminal device 3 illustrated in FIG. 5.

The optical terminal station device 2 includes a wavelength multiplexer/demultiplexer 20, an electric-to-optical converter (E/O converter) 21, and an optical-to-electric converter (O/E converter) 22. The optical terminal station device 2 further includes a divider 243, a plurality of bandpass filters (BPF) 240, a plurality of mixers 241, and a plurality of phase locked loops (PLL) 242.

The electric-to-optical converter 21 is, for example, a LD, and converts electrical data signals $S_D$ received from a backbone network NW to downlink signals that are optical signals with a wavelength $\lambda_D$. The wavelength multiplexer/demultiplexer 20 is, for example, a WDM coupler, and guides the downlink signal input from the electric-to-optical converter 21 through a transmission line 52 to the relay device 1.

The wavelength multiplexer/demultiplexer 20 guides the carrier light of the wavelength $\lambda_{UO}$ input from the relay device 1 via the transmission line 52, to the optical-to-electric converter 22. The optical-to-electric converter 22 converts the carrier light to electrical signals and outputs the electrical signals to the divider 243. The divider 243 divides the electrical signals while maintaining a substantially uniform impedance, and outputs the electrical signals to the plurality of bandpass filters 240.

The plurality of bandpass filters 240 has different transmission bands, and extracts signal components that include components with the frequencies $f_1, f_2, \ldots, f_N$ of the uplink signals, and outputs the extracted components to the plurality of mixers 241. The plurality of PLLs 242 extracts frequency signals synchronous with the frequencies $f_1, f_2, \ldots f_N$ of the uplink signals from the signal components output from the bandpass filters 240.

The plurality of mixers 241 use frequency signals input from the plurality of PLLs 242 to demodulate the signal components input from the plurality of bandpass filters 240 to create data signals $S_{U1}, \ldots, S_{UN}$. The data signals $S_{U1}, \ldots, S_{UN}$ are transmitted to the backbone network NW.

Figure 8:
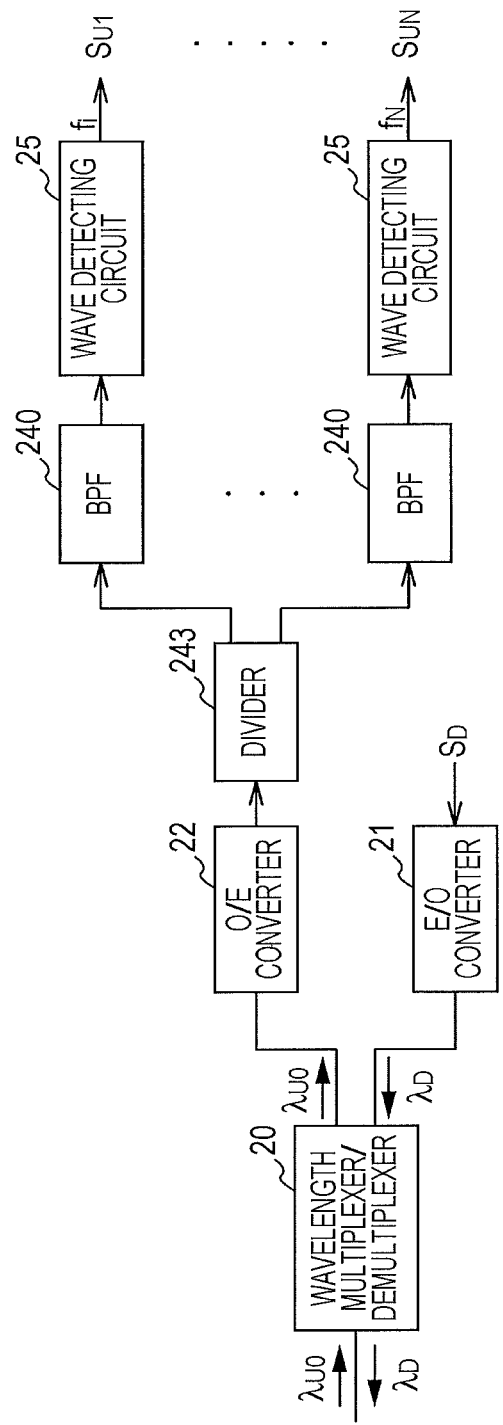
FIG. 8 illustrates another example of an optical terminal station device.

FIG. 8 illustrates another example of the optical terminal station device 2. The optical terminal station device 2 of the present example corresponds to the optical terminal device 3 illustrated in FIG. 5. The same configurations that are in FIG. 7 are given the same reference numbers in FIG. 8 and explanations thereof are omitted.

The optical terminal station device 2 includes the wavelength multiplexer/demultiplexer 20, the electric-to-optical converter (E/O converter) 21, and the optical-to-electric converter (O/E converter) 22. The optical terminal station device further includes the divider 243, the plurality of bandpass filters 240, and a plurality of wave detecting circuits 25.

The plurality of wave detecting circuits 25 demodulate the signal component received from the plurality of bandpass filters 240 to data signals $S_{U1}, \ldots, S_{UN}$ with a wave detecting method such as envelope detection or square law detection. The plurality of wave detecting circuits 25 may use optical direct-detection, heterodyne detection, or coherent detection in the demodulation process.

Figure 9:
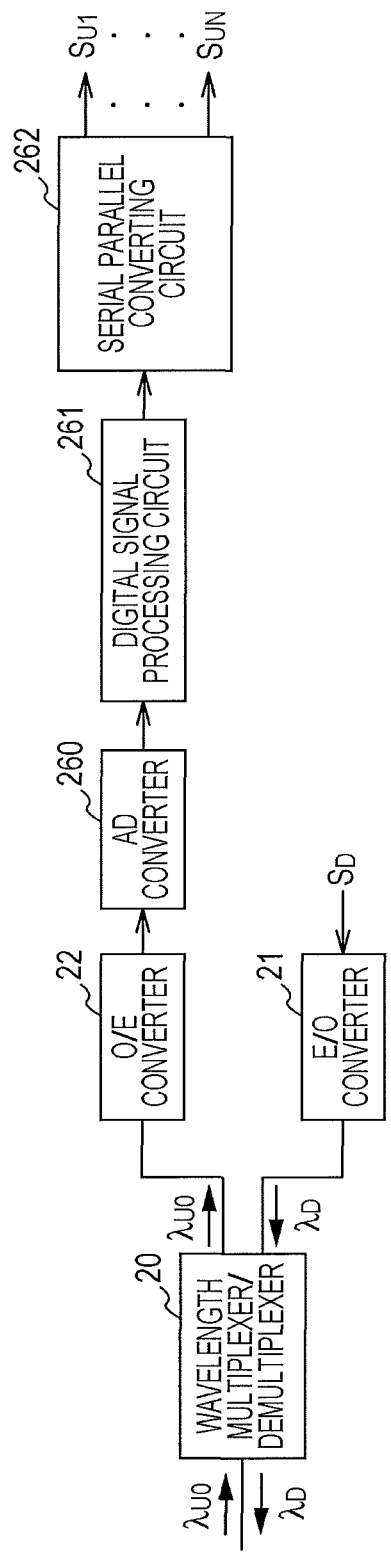
FIG. 9 illustrates another example of an optical terminal station device.

FIG. 9 illustrates an example of the optical terminal station device 2 corresponding to the optical terminal device 3 illustrated in FIG. 6. The same configurations that are in FIG. 7 are given the same reference numbers in FIG. 9 and explanations thereof are omitted.

The optical terminal station device 2 includes the wavelength multiplexer/demultiplexer 20, the electric-to-optical converter (E/O converter) 21, and the optical-to-electric converter (O/E converter) 22. The optical terminal station device 2 further includes an AD converter 260, a digital signal processing circuit 261, and a serial parallel converting circuit 262.

The AD converter 260 converts analog signals received from the optical-to-electric converter 22 into digital signals. The digital signal processing circuit 261 demodulates the digital signals received from the AD converter 260 in accordance with a modulation system on the optical terminal device 3 side. The serial parallel converting circuit 262 creates the data signals $S_{U1}, \ldots, S_{UN}$ by serial-parallel converting the signals received from the digital signal processing circuit 261.

Figure 10:
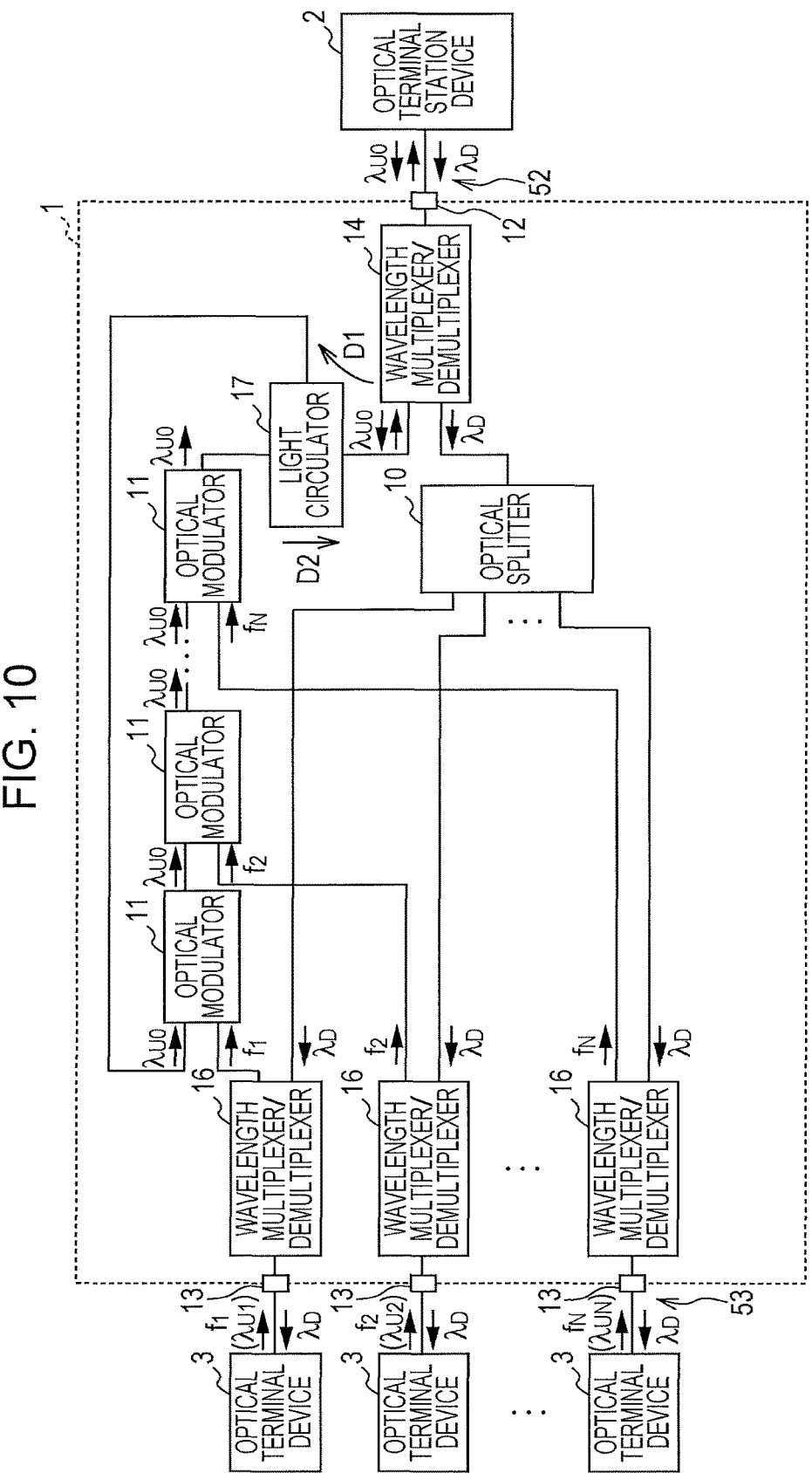
FIG. 10 illustrates a functional configuration of a relay device according to a second embodiment.

While the carrier light is supplied from the light source 15 inside the relay device 1 in the first embodiment, the carrier light is not limited in this way and may be supplied from outside of the relay device 1. FIG. 10 illustrates a functional configuration of a relay device according to a second embodiment. The same configurations that are in FIG. 2 are given the same reference numbers in FIG. 10 and explanations thereof are omitted.

The relay device 1 includes the optical splitter 10, the plurality of optical modulators 11, the first port 12, the plurality of second ports 13, the uplink wavelength multiplexer/demultiplexer 14, the plurality of downlink wavelength multiplexer/demultiplexers 16, and a light circulator 17. The light circulator 17 connects the uplink wavelength multiplexer/demultiplexer 14 with two optical modulators 11 located at either end (i.e., the input end and the output end of the carrier light) among the plurality of optical modulators 11 connected in series with each other.

In the present example, the carrier light of the wavelength $\lambda_{UO}$ is input into the relay device 1 from the optical terminal station device 2 via the first port 12. The light circulator 17 guides the carrier light supplied from the optical terminal station device 2 via the first port 12 to the plurality of optical modulators 11, and guides the carrier light modulated by the plurality of optical modulators 11 to the first port 12.

More specifically, the carrier light output from the optical terminal station device 2 is input via the first port 12 into the uplink wavelength multiplexer/demultiplexer 14, and guided to the light circulator 17 by the uplink wavelength multiplexer/demultiplexer 14. The light circulator 17 outputs the carrier light input from the uplink wavelength multiplexer/demultiplexer 14 to the optical modulator 11 at one end (initial stage) (in the example in FIG. 10, the optical modulator 11 in which the uplink signal with the frequency $f_1$ is input) among the plurality of optical modulators 11 (see arrow D1).

Moreover, the carrier light demodulated by the plurality of optical modulators 11 is input into the light circulator 17 from the optical modulator 11 at the other end (final stage) (in the example in FIG. 10, the optical modulator 11 in which the uplink signal with the frequency $f_N$ is input). The light circulator 17 guides the carrier light received from the optical modulator 11 to the uplink wavelength multiplexer/demultiplexer 14 (see arrow D2).

In this way, the carrier light in the present embodiment is supplied from the optical terminal station device 2 and circulated between the light circulator 17 and the plurality of optical modulators 11. As a result, the relay device 1 does not include the light source 15 in contrast to the first embodiment.

Therefore, the relay device 1 may be installed in a location in which the supply of electrical power is difficult (such as inside a cabinet installed above a road). Alternatively, the workload due to maintenance can be reduced since less electrical power is desired. Since the relay device 1 according to the first embodiment is provided with the light source 15, the transmission path of the carrier light is simpler than that of the second embodiment and thus adjustment of the carrier light properties is easy.

Figure 11:
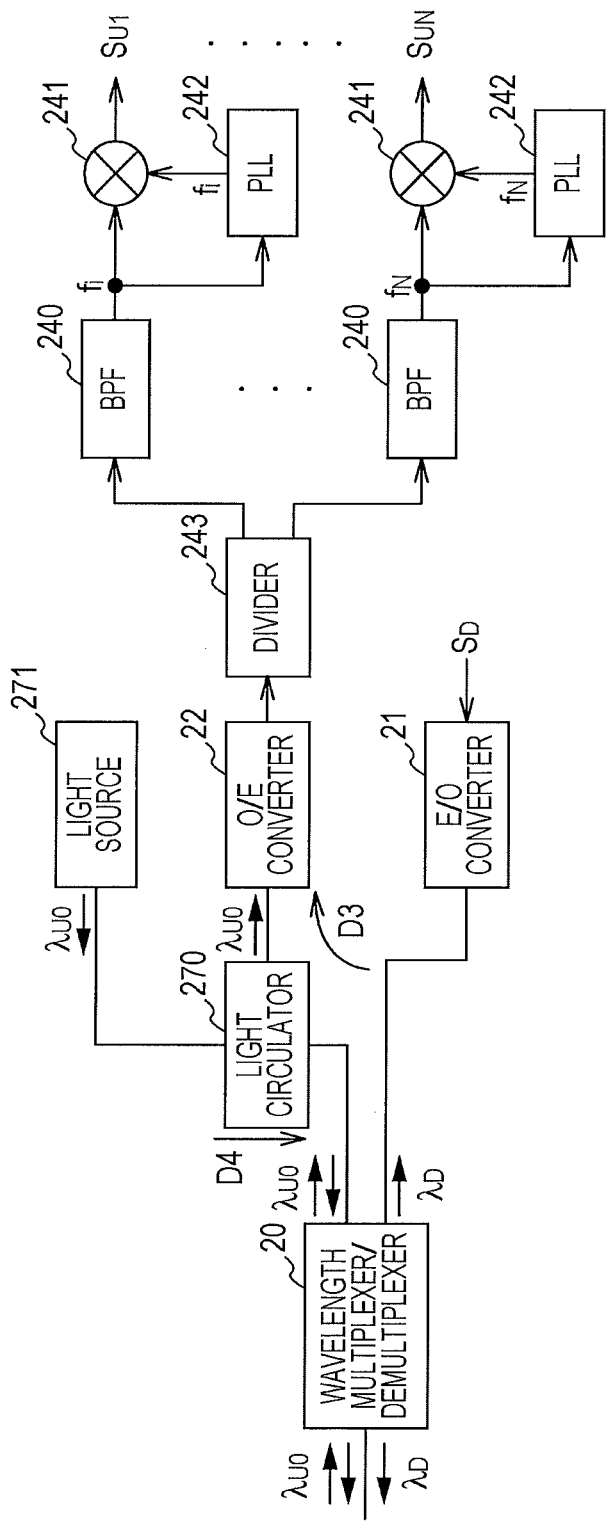
FIG. 11 illustrates an example of an optical terminal station device according to the second embodiment.

FIG. 11 illustrates an example of the optical terminal station device 2 according to the second embodiment. The same configurations that are in FIG. 7 are given the same reference numbers in FIG. 11 and explanations thereof are omitted. While the demodulation device for the uplink signals is configured in the same way as in FIG. 7 in the present example, the configurations illustrated in FIG. 8 or FIG. 9 may be used.

The optical terminal station device 2 includes the wavelength multiplexer/demultiplexer 20, the electric-to-optical converter (E/O converter) 21, the optical-to-electric converter (O/E converter) 22, a light circulator 270, and a light source 271. The optical terminal station device 2 further includes the divider 243, the plurality of bandpass filters 240, the plurality of plurality of mixers 241, and the plurality of PLLs 242.

The light circulator 270 is connected to the wavelength multiplexer/demultiplexer 20, the light source 271, and the optical-to-electric converter 22. The light circulator 270 guides the carrier light input from the wavelength multiplexer/demultiplexer 20, that is, the carrier light in which a plurality of uplink signals are superposed, to the optical-to-electric converter (see arrow D3).

The light source 271 outputs a continuous wave light (CW) to the light circulator 270 as carrier light. The light circulator 270 guides the carrier light from the light source 271 to the wavelength multiplexer/demultiplexer 20 (see arrow D4). As a result, the carrier light is input into the relay device 1 via the transmission line 52. The configuration of the optical terminal device 3 in the present embodiment is the same as those illustrated in FIG. 5 and FIG. 6.

Figure 12:
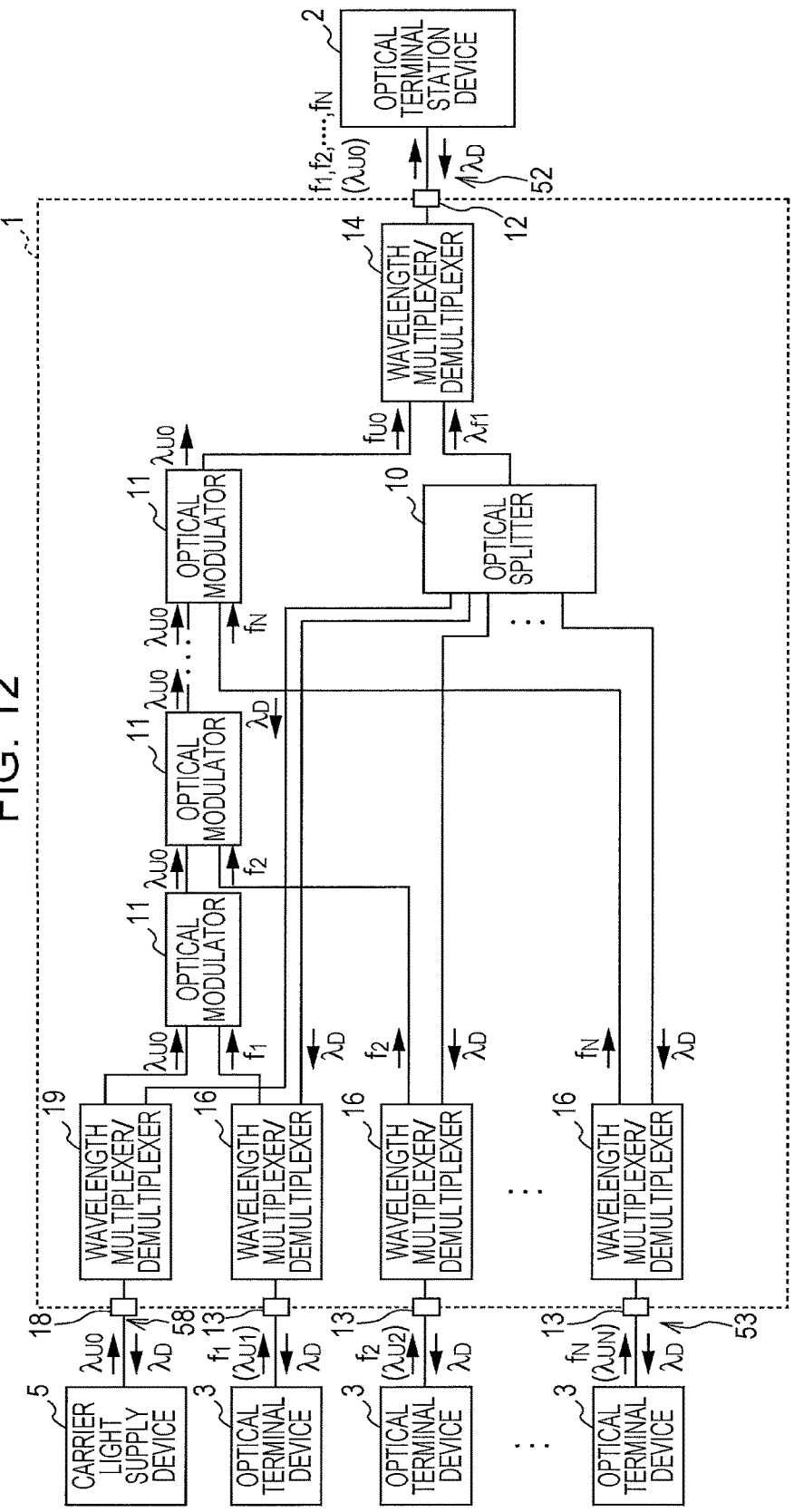
FIG. 12 illustrates a functional configuration of a relay device according to a third embodiment.

While the carrier light is supplied from the optical terminal station device 2 in the second embodiment, the carrier light may be supplied from a dedicated carrier light supply device. FIG. 12 illustrates a functional configuration of a relay device according to a third embodiment. The same configurations that are in FIG. 2 are given the same reference numbers in FIG. 12 and explanations thereof are omitted.

The relay device 1 includes the optical splitter 10, the plurality of optical modulators 11, the first port 12, the plurality of second ports 13, a third port 18, the uplink wavelength multiplexer/demultiplexer 14, the plurality of downlink wavelength multiplexer/demultiplexers 16, and a carrier light wavelength multiplexer/demultiplexer 19. The third port 18 is connected with a carrier light supply device 5 for supplying carrier light with the wavelength $\lambda_{UO}$. The carrier light wavelength multiplexer/demultiplexer 19 is connected to the third port 18 and the optical splitter 10.

The carrier light is input via the third port 18 into the carrier light wavelength multiplexer/demultiplexer, and input into the plurality of optical modulators 11 from the carrier light wavelength multiplexer/demultiplexer 19. As a result, since the relay device 1 of the present embodiment is not provided with a light source 15 therein, selectivity of installation locations and ease of maintenance are improved in the same way as in the second embodiment.

The optical splitter 10 splits first optical signals input from the optical terminal station device 2 via the first port 12 and guides the split first optical signals to the plurality of optical terminal devices 3 via the plurality of second ports 13 and to the carrier light supply device 5 via the third port 18. The carrier light wavelength multiplexer/demultiplexer 19 guides the downlink signals input from the optical splitter 10 to the third port 18.

Therefore, the carrier light supply device 5 is able to receive downlink signals from the optical terminal station device 2. As a result, if the optical terminal station device 2 includes control data corresponding to the carrier light supply device 5 in the downlink signals, the carrier light supply device 5 may adjust the characteristics of the carrier light in response to the control data. Data for adjusting the power of the carrier light of the wavelength $\lambda_{UO}$ of the carrier light, for example, may be considered as the control data.

The configuration of the carrier light supply device 5 may be a configuration in which a light source for continuous wave light is provided in place of the electric-to-optical converter 32 in the configuration of the optical terminal device 3 illustrated in FIGS. 5 and 6. The configuration example of the optical terminal device 3 in the present embodiment is the same as those illustrated in FIG. 5 and FIG. 6, and the configuration example of the optical terminal station device 2 is the same as those illustrated in FIGS. 7 to 9.

Figure 13:
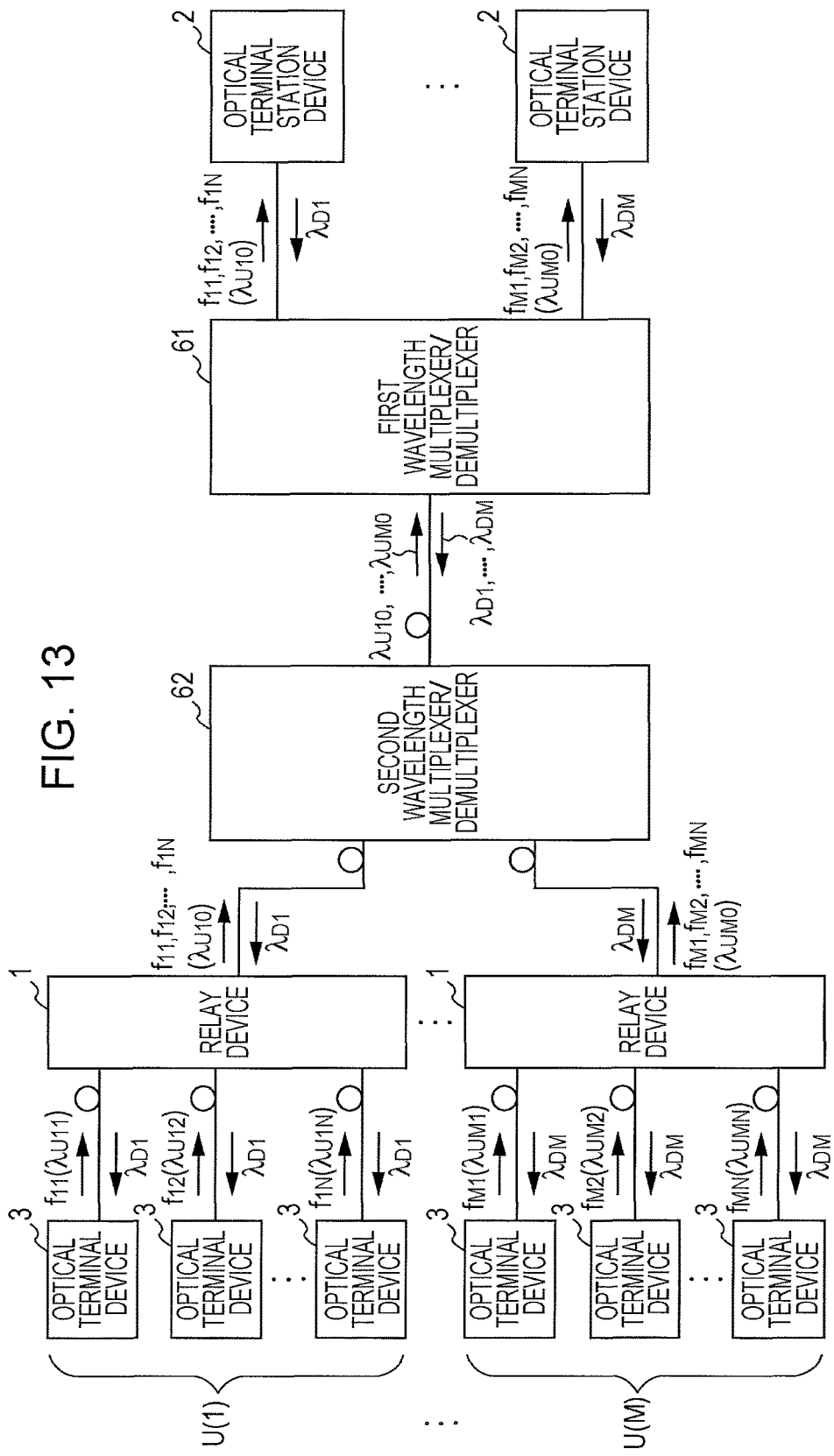
FIG. 13 illustrates a configuration of another example of an optical network system.

While the optical network system in the embodiments described above has a configuration in which one optical terminal station device 2 is connected via one relay device 1 to a plurality of optical terminal devices 3, the configuration is not limited as such. FIG. 13 illustrates a configuration of another example of an optical network system. The same configurations that are in FIG. 1 are given the same reference numbers in FIG. 13 and explanations thereof are omitted.

The optical network system includes M number of optical terminal station devices 2, M number of relay devices 1, the plurality of optical terminal devices 3, a first wavelength multiplexer/demultiplexer 61, and a second wavelength multiplexer/demultiplexer 62. The optical terminal station device 2, the relay device 1, and the optical terminal device 3 are the same as those described above. The plurality of optical terminal devices 3 are divided into M number of sets U(0) to U(M), and the sets are connected to M number of relay devices 1. While N number of optical terminal devices 3 are included in the sets U(0) to U(M), the number may vary in each set.

The first wavelength multiplexer/demultiplexer 61 and the second wavelength multiplexer/demultiplexer 62 are array waveguide gratings (AWG) having a ratio of 1:M ports, for example, and each have one port to enable connection with the other. The first wavelength multiplexer/demultiplexer 61 is connected to M number of optical terminal station devices 2 by M number of ports, and the second wavelength multiplexer/demultiplexer 62 is connected to M number of relay devices 1 by M number of ports.

The M number of optical terminal station devices 2 each transmit M number of downlink signals with different wavelengths $\lambda_D1, \ldots, \lambda_{DM}$. The M number of downlink signals are first multiplexed by the first wavelength multiplexer/demultiplexer 61, demultiplexed into wavelengths $\lambda_D1, \ldots, \lambda_{DM}$ by the second wavelength multiplexer/ demultiplexer 62, and then transmitted to the respective optical terminal devices 3 belonging to the M number of sets U(0) to (U(M) via the respective M number of relay devices 1.

The plurality of optical terminal devices 3 transmit the plurality of uplink signals with different frequencies $f_{11}, f_{12}, \ldots, f_{1N}, \ldots f_{M1}, f_{M2}, \ldots, f_{MN}$ (wavelengths $\lambda_{U11}, \lambda_{U12}, \ldots, \lambda_{U1N}, \ldots, \lambda_{UM1}, \lambda_{UM2}, \ldots, \lambda_{UMN}$ to the M number relay devices 1 for each set U(0) to (U(M). The respective M number of relay devices 1 modulates the carrier light with different wavelengths $\lambda_{U10}, \ldots, \lambda_{UM0}$ for each relay device 1 with the plurality of uplink signals and transmits the modulated carrier light to the second wavelength multiplexer/demultiplexer 62. The carrier light from the M number of relay devices 1 is first multiplexed by the second wavelength multiplexer/demultiplexer 62, then demultiplexed for each wavelength by the first wavelength multiplexer/demultiplexer 61, and then transmitted to M number of optical terminal station devices 2.

The optical network system according to the present embodiment is able to include M number of optical network systems with the connection form of 1 to N as illustrated in FIG. 1 since M number of optical terminal station devices 2 and M number of relay devices 1 are connected by the first wavelength multiplexer/demultiplexer 61 and the second wavelength multiplexer/demultiplexer 62. As a result, the optical network system according to the present embodiment is able to accommodate more subscriber loop optical lines than that of the embodiment illustrated in FIG. 1. Furthermore, since the first wavelength multiplexer/demultiplexer 61 and the second wavelength multiplexer/demultiplexer 62 are able to be connected to each other over one transmission line, an advantage is gained in that the number of optical fiber lines is reduced since the second wavelength multiplexer/demultiplexer 62 is installed in the vicinity of the subscribers' homes.

FIG. 14 illustrates a configuration of a modified example of an optical network system. The same configurations that are in FIG. 1 are given the same reference numbers in FIG. 14 and explanations thereof are omitted.

The optical network system includes the optical terminal station device 2, the relay device 1, N number of wavelength multiplexer/demultiplexers 7, and the plurality of optical terminal devices 3. The optical terminal station device 2, the relay device 1, and the optical terminal device 3 are the same as those described above. The plurality of optical terminal devices 3 are divided into N number of sets U(0) to U(N), and the sets are connected to N number of wavelength multiplexer/demultiplexers 7. While M number of optical terminal devices 3 are included in the sets U(0) to U(N), the number may vary in each set. The relay device 1 is connected to the optical terminal station device 2 and N number of wavelength multiplexer/demultiplexers 7.

The wavelength multiplexer/demultiplexer 7 is an array waveguide grating having, for example, a ratio of 1:M number of ports. The wavelength multiplexer/demultiplexer 7 is connected to the optical terminal station device 2 via one port, and is connected to M number of optical terminal devices 3 belonging to the sets U(0) to U(N) via M number of ports.

The optical terminal station device 2 transmits downlink signals of wavelength $\lambda_D$. The downlink signals are input into the N number of wavelength multiplexer/demultiplexers 7 via the relay device 1. The wavelength multiplexer/demultiplexers 7 multiplex the downlink signals and guide the downlink signals to the M number of optical terminal devices 3 belonging to the sets U(0) to U(M).

The plurality of optical terminal devices 3 transmit the plurality of uplink signals with different frequencies $f_{11}, f_{12}, \ldots, f_{1N}, \ldots, f_{M1}, f_{M2}, \ldots, f_{MN}$ (wavelengths $\lambda_{U11}, \lambda_{U12}, \ldots, \lambda_{U1N}, \ldots, \lambda_{UM1}, \lambda_{UM2}, \ldots, \lambda_{UMN}$) to the N number of wavelength multiplexer/demultiplexers 7 for each set U(0) to U(N). The plurality of uplink signals from the optical terminal devices 3 of the sets U(0) to U(N) are demultiplexed by the wavelength multiplexer/demultiplexers 7 and input into the relay device 1. The relay device 1 modulates the carrier light having wavelength $\lambda_{U0}$ with the plurality of uplink signals and transmits the modulated carrier light to the optical terminal station device 2.

The optical network system of the present example is able to include a number of optical terminal devices 3 that exceed the number of second ports 13 in the relay device 1 since the relay device 1 and the plurality of optical terminal devices 3 are connected by the N number of wavelength multiplexer/demultiplexers 7. Since the plurality of uplink signals are demultiplexed by the wavelength multiplexer/demultiplexers 7 in the present example, the frequencies $f_{i1}, \ldots, f_{iM}$ (i=1 to N) of the uplink signals are managed without the occurrence of beat noise.

As described above, the relay device 1 according to the embodiments includes the first port 12, the plurality of second ports 13, the optical splitter 10, and the plurality of optical modulators 11. The first port 12 is connected to the transmission line 52 on the optical terminal station device 2 side. The plurality of second ports 13 are connected to transmission lines 53 on the plurality of optical terminal devices 3 side.

The optical splitter 10 multiplexes the downlink signals input from the optical terminal station device 2 via the first port 12 and guides the multiplexed downlink signals to the plurality of optical terminal devices 3 via the plurality of second ports 13. In this way, the plurality of optical modulators 11 multiplexes the plurality of uplink signals with different frequencies input from the plurality of optical terminal devices 3 via the plurality of second ports 13, with the shared carrier light and inputs the multiplexed signals to the plurality of nonlinear optical mediums 110. As a result, the plurality of optical modulators 11 modulates the carrier light and transmits the carrier light to the optical terminal station device 2 via the first port 12.

According to the above configuration, the plurality of uplink signals are superposed onto the shared carrier light due to the nonlinear optical effect from the nonlinear optical medium 110, and the superposed uplink signals are received as optical frequency multiplex signals by the optical terminal station device 2. Specifically, the relay device 1 superposes the uplink signals from the optical terminal devices 3 onto the carrier light with the one wavelength $\lambda_{UO}$ and transmits the superposed uplink signals to the optical terminal station device 2. As a result, the relay device 1 does not generate beat noise due to different frequencies between the uplink signals in contrast to when a plurality of types of carrier light (subcarriers) with different frequencies (wavelengths) is used.

Moreover, since the relay device 1 frequency-multiplexes the uplink signals with the shared carrier light without performing time division multiplexing, the transmission efficiency of the uplink signals is improved. Further, since the carrier light is not a burst signal, the optical network system including the relay device 1 may allow for the lengthening of the transmission distance with the use of an optical amplifier.

Conversely, in relation to the downlink direction, the relay device 1 uses the optical splitter 10 for relaying the downlink signals from the optical terminal station device 2 to the plurality of optical terminal devices 3. The downlink signals at this time are input into the relay device 1 via the first port 12 from which the modulated carrier light is output, and the downlink signals are output from the relay device 1 via a second port 13 into which the uplink signals are input. As a result, the number of optical fibers to be used may be reduced since the relay device 1 is able to be configured in a star topology optical network along with the optical terminal station device 2 and the plurality of optical terminal devices 3.

While detailed contents of the present disclosure have been explained with reference to the preferred embodiments, it is apparent that various modifications may be applied by a person skilled in the art on the basis of the basic technical concepts and teachings of the present disclosure.

Additional Note 1. A relay device, comprising: a first port connected to a transmission line on an optical terminal station device side; a plurality of second ports correspondingly connected to a transmission line on a plurality of optical terminal devices side; a splitter configured to multiplex first optical signals input from an optical terminal station device via the first port and guides the first optical signals to a plurality of optical terminal devices via the plurality of second ports; and a plurality of optical modulators configured to modulate shared carrier light by multiplexing the carrier light with a plurality of second optical signals with different frequencies input from each of the plurality of optical terminal devices via the plurality of second ports and by inputting the multiplexed carrier light into a plurality of nonlinear optical mediums, and to transmit the carrier light to the optical terminal station device via the first port.

Additional Note 2. The relay device according to claim 1, further comprising: a light source configured to supply the carrier light to the plurality of optical modulators.

Additional Note 3. The relay device according to claim 1, further comprising: a light circulator configured to guide the carrier light supplied from the optical terminal station device via the first port to the plurality of optical modulators, and guides the carrier light modulated by the plurality of optical modulators to the first port.

Additional Note 4. The relay device according to claim 1, further comprising: a third port connected to a carrier light supply device that supplies the carrier light, wherein the carrier light is input into the plurality of optical modulators via the third port.

Additional Note 5. The relay device according to claim 4, wherein: the splitter branches the first optical signals input from the optical terminal station device via the first port and guides the first optical signals to the plurality of optical terminal devices via the plurality of second ports; and guides the first optical signals to the carrier light supply device via the third port.

Additional Note 6. The relay device according to any one of claim 1 to claim 6, wherein the plurality of optical modulators superpose the plurality of second optical signals onto the carrier light with a cross phase modulation generated in the plurality of nonlinear optical mediums.

Additional Note 7. An optical network system, comprising: an optical terminal station device; the relay device described in any one of claims 1 to 6; and a plurality of optical terminal devices connected to the optical terminal station device via the relay device; wherein the optical terminal station device transmits first optical signals to the plurality of optical terminal devices via the relay device; the plurality of optical terminal devices transmits a plurality of second optical signals with different frequencies to the relay device; and the relay device modulates the carrier light with the plurality of second optical signals and transmits the modulated carrier light to the optical terminal station device.

Additional Note 8. An optical network system, comprising: a plurality of optical terminal station devices; a plurality of the relay devices described in any one of claims 1 to 6; a plurality of optical terminal devices divided into a plurality of sets and connected to respective sets of the plurality of relay devices; a first multiplexer/demultiplexer connected to the plurality of optical terminal station devices; and a second multiplexer/demultiplexer connected to the first multiplexer/demultiplexer and to the plurality of relay devices; wherein, the plurality of optical terminal station devices transmits a plurality of first optical signals having different wavelengths; the plurality of first optical signals are multiplexed by the first multiplexer/demultiplexer, demultiplexed into separate wavelengths by the second multiplexer/demultiplexer, and transmitted to the plurality of sets of the plurality of optical terminal devices via each of the plurality of relay devices; the plurality of optical terminal devices transmits a plurality of second optical signals with different frequencies to the plurality of relay devices for each set; each of the plurality of relay devices modulates the carrier light having different wavelengths for each of the relay devices with the plurality of second optical signals, and transmits the modulated carrier light to the second multiplexer/demultiplexer; and the carrier light from the plurality of relay devices is demultiplexed by the second multiplexer/demultiplexer, multiplexed into separate wavelengths by the first multiplexer/demultiplexer, and transmitted to each of the plurality of optical terminal station devices.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay device, comprising:
a first port coupled to a first transmission line provided on a side of the optical terminal station device;
a plurality of second ports coupled to respective second transmission lines on a side of the plurality of optical terminal devices;
a splitter configured to branch a first optical signal input from the optical terminal station device via the first port and coupled to the plurality of second ports so as to guide the first optical signal to each of the plurality of optical terminal devices via the respective second ports;
a plurality of optical modulators, coupled to the first port and the plurality of second ports, configured to modulate shared carrier light by multiplexing the carrier light with a plurality of second optical signals with different frequencies input from the plurality of optical terminal devices via the plurality of second ports, and to transmit the multiplexed carrier light to the optical terminal station device via the first port; and
wherein the plurality of optical modulators are coupled in a cascade connection such that respective outputs of the plurality of optical modulators other than an optical modulator located at a last stage are coupled to respective inputs of the plurality of optical modulators located at a following stage, and an output of the optical modulator located at the last stage is coupled to the first port;
a third port connected to a carrier light supply device that supplies the carrier light,
wherein the carrier light is input into the plurality of optical modulators via the third port, and the splitter is coupled to the carrier light supply device via the third port to guide the first optical signal to the carrier light supply device via the third port.

2. The relay device according to claim 1, further comprising: a light source configured to supply the carrier light to the plurality of optical modulators.

3. The relay device according to claim 1, further comprising: a light circulator configured to guide the carrier light supplied from the optical terminal station device via the first port to the plurality of optical modulators, and guide the carrier light modulated by the plurality of optical modulators to the optical terminal station device via the first port.

4. The relay device according to claim 1, wherein
the plurality of optical modulators superpose the plurality of second optical signals onto the carrier light with a cross phase modulation generated in the plurality of nonlinear optical mediums.

5. An optical network system, comprising:
an optical terminal station device;
a relay device; and
a plurality of optical terminal devices coupled to the optical terminal station device via the relay device,
wherein the relay device includes:
a first port coupled to a first transmission line provided on a side of the optical terminal station device,
a plurality of second ports coupled to respective second transmission lines on a side of the plurality of optical terminal devices,
a splitter configured to branch a first optical signal input from the optical terminal station device via the first port and coupled to the plurality of second ports so as to guide the first optical signal to each of the plurality of optical terminal devices via the respective second ports,
a plurality of optical modulators, coupled to the first port and the plurality of second ports, configured to modulate shared carrier light by multiplexing the carrier light with a plurality of second optical signals with different frequencies input from the plurality of optical terminal devices via the plurality of second ports, and to transmit the multiplexed carrier light to the optical terminal station device via the first port, and
a third port connected to a carrier light supply device that supplies the carrier light, wherein the carrier light is input into the plurality of optical modulators via the third port, and the splitter is coupled to the carrier light supply device via the third port to guide the first optical signal to the carrier light supply device via the third port,
the optical terminal station device transmits the first optical signal to the plurality of optical terminal devices via the relay device,
the plurality of optical terminal devices transmits the plurality of second optical signals with different frequencies to the relay device,
the relay device modulates the carrier light with the plurality of second optical signals and transmits the modulated carrier light to the optical terminal station device, and the plurality of optical modulators are coupled in a cascade connection such that respective outputs of the plurality of optical modulators other than an optical modulator located at a last stage are coupled to respective inputs of the plurality of optical modulators located at a following stage, and an output of the optical modulator located at the last stage is coupled to the first port.

6. An optical network system, comprising:
a plurality of optical terminal station devices;
device plurality of relay devices; and
a plurality of optical terminal devices coupled to the plurality of optical terminal station devices via the plurality of relay devices,
wherein each of the plurality of relay devices includes:
a first port coupled to a first transmission line provided on a side of the optical terminal station device,
a plurality of second ports coupled to respective second transmission lines on a side of the plurality of optical terminal devices,
a splitter configured to branch a first optical signal input from the plurality of optical terminal station devices via the first port and coupled to the plurality of second ports so as to guide the first optical signal to each of the plurality of optical terminal devices via the respective second ports,
a plurality of optical modulators, coupled to the first port and the plurality of second ports, configured to modulate shared carrier light by multiplexing the carrier light with a plurality of second optical signals with different frequencies input from the plurality of optical terminal devices via the plurality of second ports, and to transmit the multiplexed carrier light to the plurality of optical terminal station devices via the first port, the plurality of optical modulators being coupled in a cascade connection such that respective outputs of the plurality of optical modulators other than an optical modulator located at a last stage are coupled to respective inputs of the plurality of optical modulators located at a following stage, and an output of the optical modulator located at the last stage is coupled to the first port, and
a third port connected to a carrier light supply device that supplies the carrier light, wherein the carrier light is input into the plurality of optical modulators via the third port, and the splitter is coupled to the carrier light supply device via the third port to guide the first optical signal to the carrier light supply device via the third port,
wherein the optical network system further includes:
a first multiplexer/demultiplexer coupled to the plurality of optical terminal station devices; and
a second multiplexer/demultiplexer coupled to the first multiplexer/demultiplexer and to the plurality of relay devices,
wherein the plurality of optical terminal station devices transmits a plurality of first optical signals having different wavelengths;
the plurality of first optical signals are multiplexed by the first multiplexer/demultiplexer, demultiplexed into separate wavelengths by the second multiplexer/demultiplexer, and transmitted to the plurality of optical terminal devices via each of the plurality of relay devices;
the plurality of optical terminal devices transmits a plurality of second optical signals with different frequencies to the plurality of relay devices;

each of the plurality of relay devices modulates the carrier light having different wavelengths for each of the relay devices with the plurality of second optical signals, and transmits the modulated carrier light to the second multiplexer/demultiplexer; and the carrier light from the plurality of relay devices is demultiplexed by the second multiplexer/demultiplexer, multiplexed into separate wavelengths by the first multiplexer/demultiplexer, and transmitted to each of the plurality of optical terminal station devices.

7. The relay device according to claim 1, wherein each of the plurality of optical modulators includes an optical multiplexer configured to multiplex the carrier light with one of the plurality of second optical signals and a nonlinear optical medium configured to pass an output of the optical multiplexer to supply the output to the respective inputs of the plurality of optical modulators located at the following stage or the first port.

8. The optical network system according to claim 5, wherein each of the plurality of optical modulators includes an optical multiplexer configured to multiplex the carrier light with one of the plurality of second optical signals and a nonlinear optical medium configured to pass an output of the optical multiplexer to supply the output to the respective inputs of the plurality of optical modulators located at the following stage or the first port.

9. The optical network system according to claim 6, wherein each of the plurality of optical modulators includes an optical multiplexer configured to multiplex the carrier light with one of the plurality of second optical signals and a nonlinear optical medium configured to pass an output of the optical multiplexer to supply the output to the respective inputs of the plurality of optical modulators located at the following stage or the first port.

* * * * *